(12) United States Patent
Morimoto et al.

(10) Patent No.: US 8,732,743 B2
(45) Date of Patent: May 20, 2014

(54) PASSENGER INFORMATION CONTROL DEVICE AND METHOD FOR PROVIDING VIDEO DATA FOR PASSENGER INFORMATION CONTROL DEVICE

(75) Inventors: Kazunari Morimoto, Tokyo (JP); Masao Oki, Tokyo (JP); Tetsuya Shigeeda, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 206 days.

(21) Appl. No.: 12/933,121

(22) PCT Filed: Mar. 23, 2009

(86) PCT No.: PCT/JP2009/055677
§ 371 (c)(1),
(2), (4) Date: Sep. 17, 2010

(87) PCT Pub. No.: WO2009/133735
PCT Pub. Date: Nov. 5, 2009

(65) Prior Publication Data
US 2011/0016486 A1 Jan. 20, 2011

(30) Foreign Application Priority Data
Apr. 28, 2008 (JP) ................. 2008-117607

(51) Int. Cl.
*H04N 7/10* (2006.01)
*H04N 7/025* (2006.01)

(52) U.S. Cl.
USPC ............................................. 725/32; 725/75

(58) Field of Classification Search
USPC ................................................... 725/32–36
See application file for complete search history.

(56) References Cited

U.S. PATENT DOCUMENTS 6,311,011 B1 10/2001 Kuroda
6,613,099 B2 * 9/2003 Crim ............................ 715/210
(Continued)

FOREIGN PATENT DOCUMENTS

CN 1367597 A 9/2002
EP 1100063 A2 5/2001
(Continued)

OTHER PUBLICATIONS

Office Action (Notice of Rejection) dated May 15, 2012, issued by the Japanese Patent Office in the corresponding Japanese Patent Application No. 2010-510061 and partial English translation thereof. (6 pages).

(Continued)

*Primary Examiner* — Nnenna Ekpo
(74) *Attorney, Agent, or Firm* — Buchanan Ingersoll & Rooney PC

(57) ABSTRACT

A passenger information control device having a video display controller that transmits video data sent from a ground transmission controller to display devices in a train includes: a storage unit that stores a program table and the video data, the program table storing a number of times an advertisement video has been presented, a validity period of the advertisement video, a time period from the last presentation time to the present, and a volume of the video data, being associated with each advertisement; a deletion determining unit that determines whether to designate the video data as a candidate for deletion based on a program table; and a deleting unit that deletes the video data stored in the storage unit based on determination by the deletion determining unit.

14 Claims, 12 Drawing Sheets

(56) References Cited

U.S. PATENT DOCUMENTS

| | | | |
|---|---|---|---|
| 7,027,171 B1* | 4/2006 | Watanabe | 358/1.15 |
| 7,092,733 B2 | 8/2006 | Mukai et al. | |
| 7,206,601 B2 | 4/2007 | Mukai et al. | |
| 7,337,456 B1 | 2/2008 | Nihei | |
| 7,979,391 B2 | 7/2011 | Watanabe et al. | |
| 8,214,726 B2* | 7/2012 | Funabiki et al. | 714/786 |
| 2002/0098864 A1 | 7/2002 | Mukai et al. | |
| 2002/0199201 A1* | 12/2002 | Kurauchi | 725/104 |
| 2004/0062522 A1* | 4/2004 | Kitora et al. | 386/46 |
| 2005/0086258 A1 | 4/2005 | Murahashi et al. | |
| 2006/0035671 A1 | 2/2006 | Mukai et al. | |
| 2008/0091687 A1* | 4/2008 | Watanabe et al. | 707/10 |
| 2008/0127245 A1* | 5/2008 | Olds | 725/32 |
| 2013/0024893 A1* | 1/2013 | Ellis et al. | 725/39 |

FOREIGN PATENT DOCUMENTS

| | | |
|---|---|---|
| EP | 1870816 A1 | 12/2007 |
| JP | 10-155140 A | 6/1998 |
| JP | 2000-184320 A | 6/2000 |
| JP | 2000-311416 A | 11/2000 |
| JP | 2001-283501 A | 10/2001 |
| JP | 2002-133261 A | 5/2002 |
| JP | 2002-163182 A | 6/2002 |
| JP | 2002-314910 A | 10/2002 |
| JP | 2003-110982 A | 4/2003 |
| JP | 2003-179899 A | 6/2003 |
| JP | 2003-309809 A | 10/2003 |
| JP | 2004-086288 A | 3/2004 |
| JP | 2006-287959 A | 10/2006 |
| JP | 2008-085685 A | 4/2008 |
| WO | WO 2006/090612 A1 | 8/2006 |

OTHER PUBLICATIONS

International Search Report (PCT/ISA/210) issued on Apr. 14, 2009, by Japanese Patent Office as the International Searching Authority for International Application No. PCT/JP2009/055677.

Written Opinion (PCT/ISA/237) issued on Apr. 14, 2009, by Japanese Patent Office as the International Searching Authority for International Application No. PCT/JP2009/055677.

Office Action from Chinese Patent Office dated Jul. 20, 2012, issued in corresponding Chinese Patent Application No. 200980115735.6, with a partial English translation thereof.

Notice of Allowance (Decision of a Patent Grant) from Japanese Patent Office dated Aug. 28, 2012, issued in corresponding Japanese Patent Application No. 2010-510061, with English translation thereof.

Office Action from Canadian Intellectual Property Office dated Jan. 16, 2013, issued in corresponding Canadian Patent Application No. 2,722,825.

Extended Search Report from European Patent Office dated Mar. 22, 2013, issued in corresponding European Patent Application No. 09738672.6.

Office Action from Chinese Patent Office dated May 23, 2013, issued in corresponding Chinese Patent Application No. 200980115735.6, with a partial English translation thereof. (6 pages).

\* cited by examiner

FIG.4

| No. | VALIDITY PERIOD (START) | VALIDITY PERIOD (EXPIRE) | LAST PRESENTATION TIME | VIDEO DATA NAME | FILE VOLUME | DELETION CANDIDATE FLAG |
|---|---|---|---|---|---|---|
| 1 | 2008/01/16 0:00 | 2008/01/31 0:00 | 2008/01/30 17:00 | BEVERAGE COMPANY'S CM 1 | 20MB | |
| 2 | 2008/01/16 0:00 | 2008/01/31 0:00 | 2008/01/31 17:05 | BEVERAGE COMPANY'S CM 2 | 20MB | |
| 3 | 2008/01/16 0:00 | 2008/01/31 0:00 | 2008/01/31 17:10 | HEALTH FOOD COMPANY'S CM 1 | 40MB | |
| 4 | 2008/01/31 0:00 | 2008/02/15 0:00 | 2008/02/01 10:10 | HEALTH FOOD COMPANY'S CM 2 | 50MB | |
| 5 | 2008/01/31 0:00 | 2008/02/15 0:00 | 2008/02/01 11:10 | TOY COMPANY'S CM 1 | 10MB | |
| 6 | 2008/01/31 0:00 | 2008/02/15 0:00 | 2008/02/01 12:10 | TOY COMPANY'S CM 2 | 30MB | |
| ... | ... | ... | ... | ... | ... | |

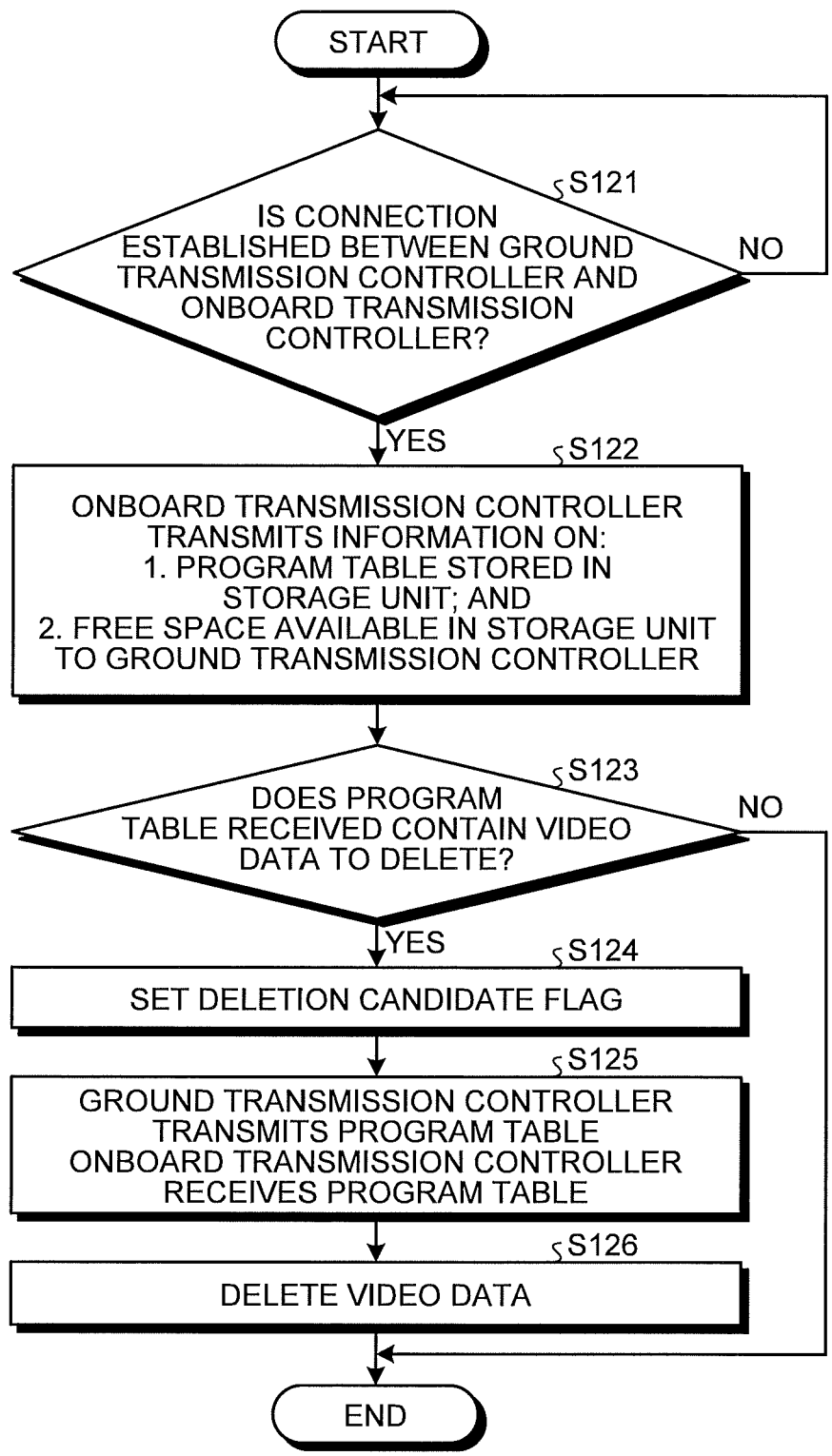

PASSENGER INFORMATION CONTROL DEVICE AND METHOD FOR PROVIDING VIDEO DATA FOR PASSENGER INFORMATION CONTROL DEVICE

TECHNICAL FIELD

The present invention relates to an passenger information control device that provides advertisement information to passengers in a train.

BACKGROUND ART

Along with increasing diversities in lifestyles and activity patterns of people today, advertisement videos provided by mass media and the like have significant influence on such people with diversities. The increased availability of the Internet in recent years also makes people demand for new information, and advertisement pictures or videos posted or displayed in trains, for example, are expected to have high advertising effects. Particularly due to the fact that an in-train space is confined and activities of passengers are limited, advertisement videos are considered to be highly effective as means for advertisement. Accordingly, the demand for such advertisement is rapidly growing.

Further, with the emergence of high definition videos and display devices with larger-sized screens, video data for some advertisements is now as large as 50 megabytes. Accordingly, it is desired that a storage medium for use in a train is capable of storing a large amount of video data for a long period of time. However, conditions specific to trains require a storage medium that is very expensive per unit capacity, for example, a semiconductor disk that is resistant to heat and vibration. Thus, it poses large limitations on recording of video data. Therefore, there have been taken some measures such as deleting unnecessary video data to efficiently use the storage capacity of a storage medium.

Conventionally, information providing devices disclosed in, for example, Patent Documents 1 and 2, secure a free space in a storage medium by deleting video data in chronological order, i.e., from one recorded on the storage medium at an earlier time and whose validity period has expired.

Patent Document 1: Japanese Patent Application Laid-open No. 2002-314910

Patent Document 2: Japanese Patent Application Laid-open No. 2003-110982

DISCLOSURE OF INVENTION

Problem to be Solved by the Invention

Video data for advertisement videos to be presented in a train is transmitted from a ground transmission controller when the train stops at a station and then stored in a storage medium carried in the train. Although such video data includes a large quantity of video data that is to be presented again, conventional devices adopt an approach of deleting video data upon expiration of validity period to secure a free space in the storage medium. It may appear that once deleted video data can be retransmitted when the train stops at a station. However, because video data has a tendency to have a larger volume as mentioned above, the boarding and alighting time is sometimes not sufficient enough to transmit video data. That is, there is a problem in that the storage capacity of a storage medium cannot be efficiently used with the approach of deleting video data whose validity period has expired, because this approach is not able to delete only video data that is really unnecessary.

The present invention has been achieved in view of the above problem, and an object of the present invention is to provide an passenger information control device that is capable of effectively using the storage capacity of a storage medium.

Means for Solving Problem

A passenger information control device according to an aspect of the present invention has a video display controller that transmits, to a display device in a train, video data for an in-train advertisement, which is transmitted from a ground transmission controller to an onboard transmission controller, the passenger information control device includes: a storage unit that stores a program table and the video data, the program table storing at least one of number of times an advertisement video has been presented, a validity period of the advertisement video, a time period from a last presentation time to present time, and a volume of the video data, being associated with each advertisement; a deletion determining unit that receives the program table via the video display controller and determines whether to designate the video data as a candidate for deletion based on the program table; and a deleting unit that deletes the video data stored in the storage unit based on determination by the deletion determining unit.

Effect of the Invention

Because the passenger information control device according to the present invention determines the number of times an advertisement video has been presented, the validity period, the time period from the last presentation time to the present time, or the volume of the video data, the passenger information control device can effectively use the storage capacity of a recording medium.

BRIEF DESCRIPTION OF DRAWINGS

FIG. 4 depicts an example of a program table.

FIG. 12 depicts an exemplar flowchart of a flow of determining deletion of video data on the ground transmission controller side.

EXPLANATIONS OF LETTERS OR NUMERALS

Figure 1:
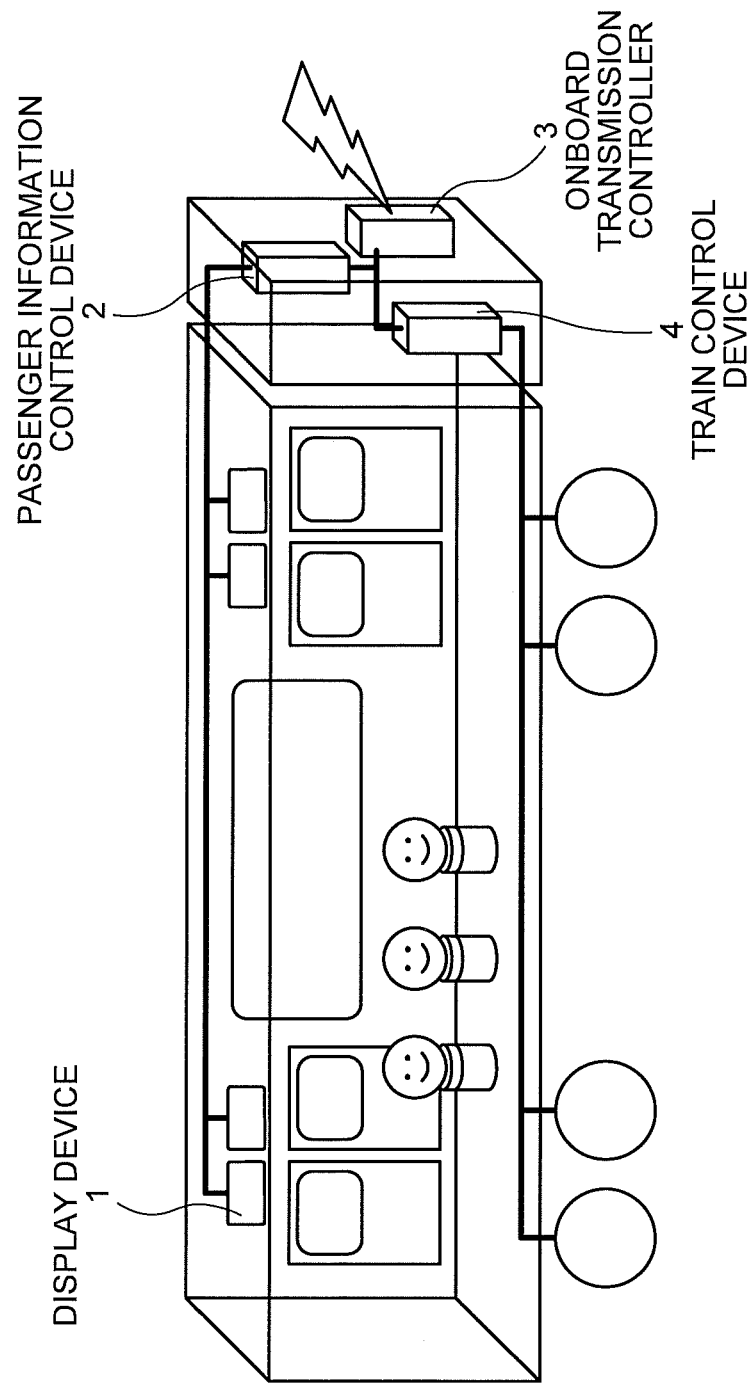
FIG. 1 depicts an exemplar configuration of a passenger information control device according to a first embodiment and devices connected to the passenger information control device.

1 Display device
2 Passenger information control device
3 Onboard transmission controller
4 Train control device
5 Information processing device
6 Ground transmission controller
7 Terminal
8 Storage unit
9 Number of presentation
10 Timer
11 Deletion determining unit
12 Deleting unit
13 Video display controller
14 Program-table storing unit
15 Presentation count database
16 Video-data storing unit
17 Time
40a, 40b, 40c, 40d Program table
41 Validity period (start)
42 Validity period (expire)
43 Last presentation time
44 Video data name
45 File volume
46 Deletion-candidate-flag storage portion
50 Presentation count table
51 Video data name
52 Presentation-count display portion
60a, 60b, 60c Video data

BEST MODE(S) FOR CARRYING OUT THE INVENTION

Exemplary embodiments of a passenger information control device according to the present invention will be explained below in detail with reference to the accompanying drawings. The present invention is not limited to the embodiments.

First Embodiment

FIG. 1 is an example of a configuration of a passenger information control device according to a first embodiment and devices connected to the passenger information control device. A train car shown in FIG. 1 includes display devices 1, a passenger information control device 2, an onboard transmission controller 3, and a train control device 4.

Figure 2:
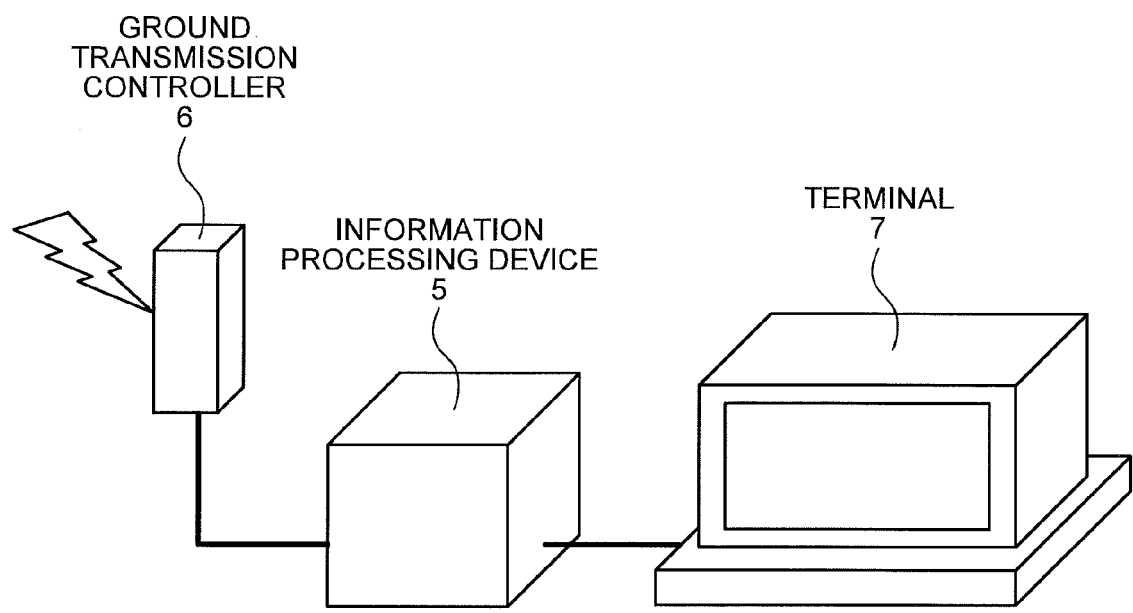
FIG. 2 depicts an exemplar configuration of a ground transmission controller and devices connected to the ground transmission controller.

FIG. 2 is an example of a configuration of a ground transmission controller and devices connected to the ground transmission controller. A ground transmission controller 6 is installed at a station platform, for example, and is connected to an information processing device 5 that processes program tables and the like. To the information processing device 5, a terminal 7 such as a personal computer is connected and is used for updating a program table and other operations.

Figure 3:
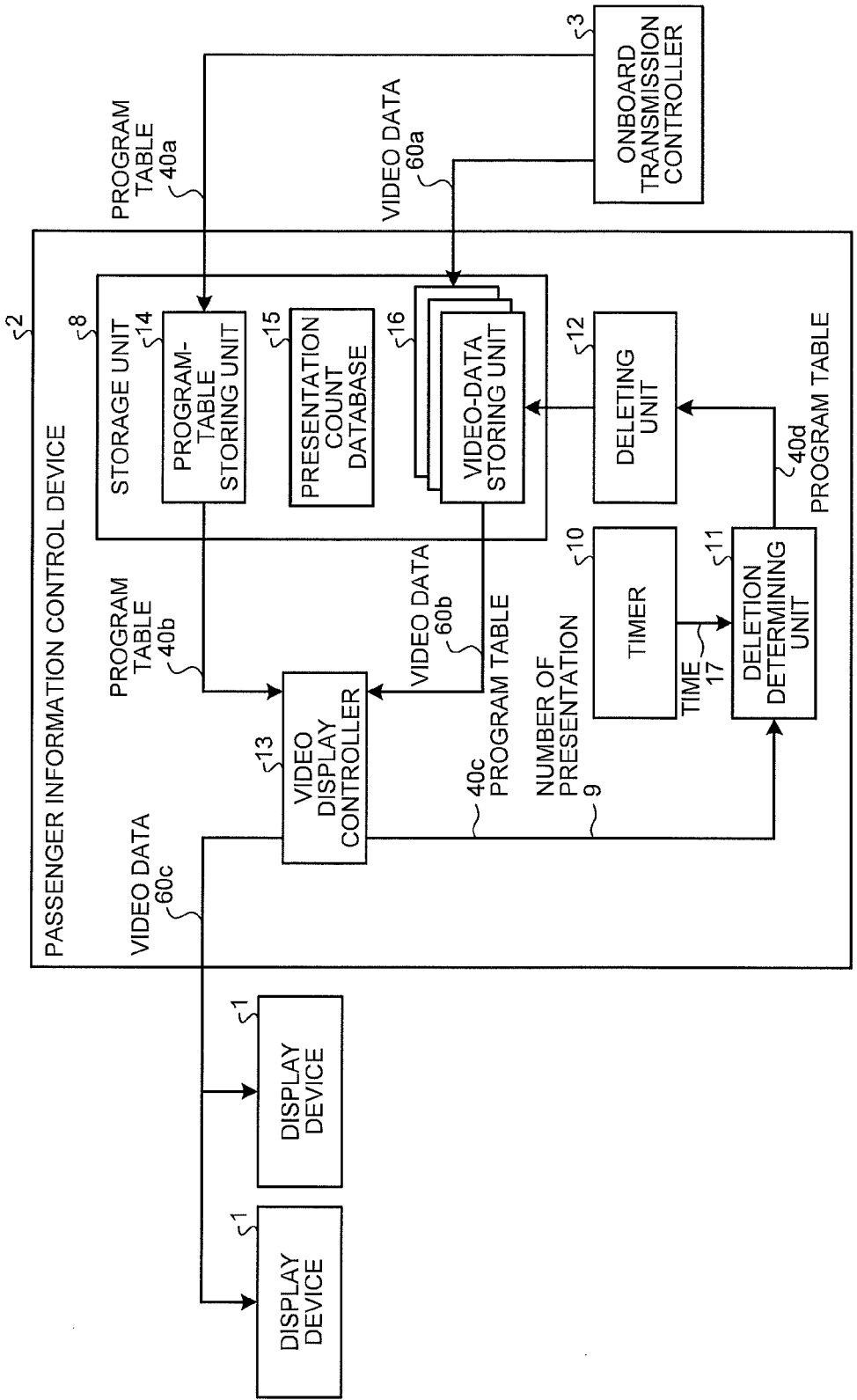
FIG. 3 depicts a block diagram of an example of a configuration of the passenger information control device.

FIG. 3 is a block diagram of an example of a configuration of the passenger information control device. The passenger information control device 2 includes a storage unit 8, a timer 10, a deletion determining unit 11, a deleting unit 12, and a video display controller 13. To the passenger information control device 2, the onboard transmission controller 3 and the display devices 1 are connected.

In FIG. 1, the onboard transmission controller 3 is installed in the front car of a train, for example, and is capable of receiving a program table 40a and video data 60a transmitted from the ground transmission controller 6 when the train stops at a station platform. The passenger information control device 2 is capable of receiving and storing the program table 40a and the video data 60a transmitted from the ground transmission controller 6 via the onboard transmission controller 3.

The train control device 4 processes station information, estimated arrival times and the like, and provides the latest route information and the like to the display devices 1 via the passenger information control device 2.

The display devices 1 receive from the passenger information control device 2 the video data 60c relating to advertisements or data on routes supplied by the train control device 4, and provide advertisement videos or the like to the passengers in the train.

FIG. 1 depicts the display devices 1, the passenger information control device 2, the onboard transmission controller 3, and the train control device 4 which are installed in a train car. When there are plural train cars, the passenger information control device 2 is installed in each train car to transmit video data 60c to plural display devices 1 in the train cars. In this case, such a configuration can be obtained by connecting a transmission path provided across train cars to the passenger information control device 2 on each car and transmitting the program table 40a and the video data 60a, which are received by the passenger information control device 2 of the front car, to the passenger information control device 2 of each train car.

In FIG. 3, the storage unit 8 includes a program-table storing unit 14, a presentation count database 15, a video-data storing unit 16 or the like.

The program-table storing unit 14 is capable of storing the program table 40a transmitted from the ground transmission controller 6 and sending a program table 40b to the video display controller 13. The presentation count database 15 can store the number of presentations 9 of an advertisement video on the display devices 1. The video-data storing unit 16 can store the video data 60a transmitted from the ground transmission controller 6.

The deletion determining unit 11 determines whether to designate the video data 60a recorded in the video-data storing unit 16 as a candidate for deletion based on the validity period (dates and times of presentation start and end) of the video data 60a. When there is any video data 60a as a candidate for deletion, a code indicating that the video data 60a is a candidate for deletion (hereinafter, "deletion candidate flag") can be set in a program table 40c. Determination of whether to designate video data as a candidate for deletion, can also utilize used the time period from the last presentation time of the corresponding advertisement video to the present time, the number of presentations 9, or the volume of the video data 60a, in addition to the validity period of the video data 60a.

The deleting unit 12 receives a program table 40d sent from the deletion determining unit 11, and checks the video data 60a, on which the deletion candidate flag is set against several further conditions for determination. According to the result of determination, the deleting unit 12 deletes the appropriate video data 60a recorded in the storage unit 8.

The timer 10 is used for calculating the time period between the last presentation time and the present time. Specifically, the timer 10 transmits a time 17 to the deletion determining unit 11 or the deleting unit 12. The deletion determining unit 11 or the deleting unit 12 compares the time 17 with the last presentation time recorded in the program table 40c or 40d, and calculates the time period from the last presentation time to the present time. Although FIG. 3 depicts a configuration such that the timer 10 is connected with the deletion determining unit 11, this embodiment is not limited thereto, and the timer 10 can be connected to the deleting unit 12, for example.

The video display controller 13 takes in the program table 40b and video data 60b from the storage unit 8, and determines the validity period of the video data 60b and whether the deletion candidate flag is set on the video data 60b. Then, the video display controller 13 transmits the video data 60c of an advertisement video that is within its validity period and that does not have a deletion candidate flag to the display devices 1. When the video data 60c is transmitted to the display devices 1, the video display controller 13 also increments the number of presentations and records the last presentation time.

As described above, the passenger information control device 2 is configured to be able to determine whether an advertisement video has been presented not frequently because the video is not popular, whether a considerable amount of time has elapsed from the last presentation time to the present, or whether the volume of video data is relatively large in addition to determining the validity period of the video data 60a, through predetermined determination performed by the deletion determining unit 11 or the deleting unit 12. This means the video data 60a which is likely to be presented again can be kept in the storage unit 8.

FIG. 4 is an example of a program table. A program table 40 shown in FIG. 4 includes a validity period (start) 41, a validity period (expire) 42, a last presentation time 43, a video data name 44, a file volume 45, and a deletion-candidate-flag storage portion 46.

The validity period (start) 41 indicates the date and time at which presentation of the video data 60a starts. The validity period (expire) 42 indicates the date and time at which presentation of the video data 60a ends. The last presentation time 43 indicates the date and time the advertisement video was last presented. The video data name 44 indicates the title of the video data 60a.

The file volume 45 indicates the volume of a video data file having the title indicated in the video data name 44.

The deletion-candidate-flag storage portion 46 is an entry for recording a deletion candidate flag when a deletion candidate flag is set on the video data 60a chosen as a candidate for deletion by the deletion determining unit 11.

Because the entries in the program table 40 correspond to serial numbers in the leftmost column, the deletion determining unit 11 or the deleting unit 12 can check the video data 60a in order of the serial numbers and make determination on deletion for each video data. The number and the contents of entries in the program table 40 are not limited to those described here. Also, serial numbers can be arranged in descending order to make it possible to perform a deletion determination process. Furthermore, although a deletion candidate flag is given to the video data 60a as a candidate for deletion, this embodiment is not limited thereto and, for example, a checkbox format can be used and checkmarks are provided for checking.

Figure 5:
FIG. 5 depicts an example of a presentation count table.

FIG. 5 is an example of a presentation count table. A presentation count table 50 shown in FIG. 5 includes a video data name 51 and a presentation-count display portion 52.

The presentation-count display portion 52 can record the number of times an advertisement video has been presented. The presentation-count display portion 52 can also indicate the number of presentations which is arbitrarily set on the ground transmission controller 6 side for an advertisement video whose number of presentations is negotiated with a sponsor, for example, instead of the number of times an advertisement video has been presented on the display devices 1.

Because the entries in the presentation count table 50 correspond to serial numbers shown in the leftmost column, the deletion determining unit 11 or the deleting unit 12 can check the video data 60a in order of the serial numbers and make determination on deletion for each video data. The number and the contents of entries in the presentation count table 50 are not limited to those described here.

Figure 6:
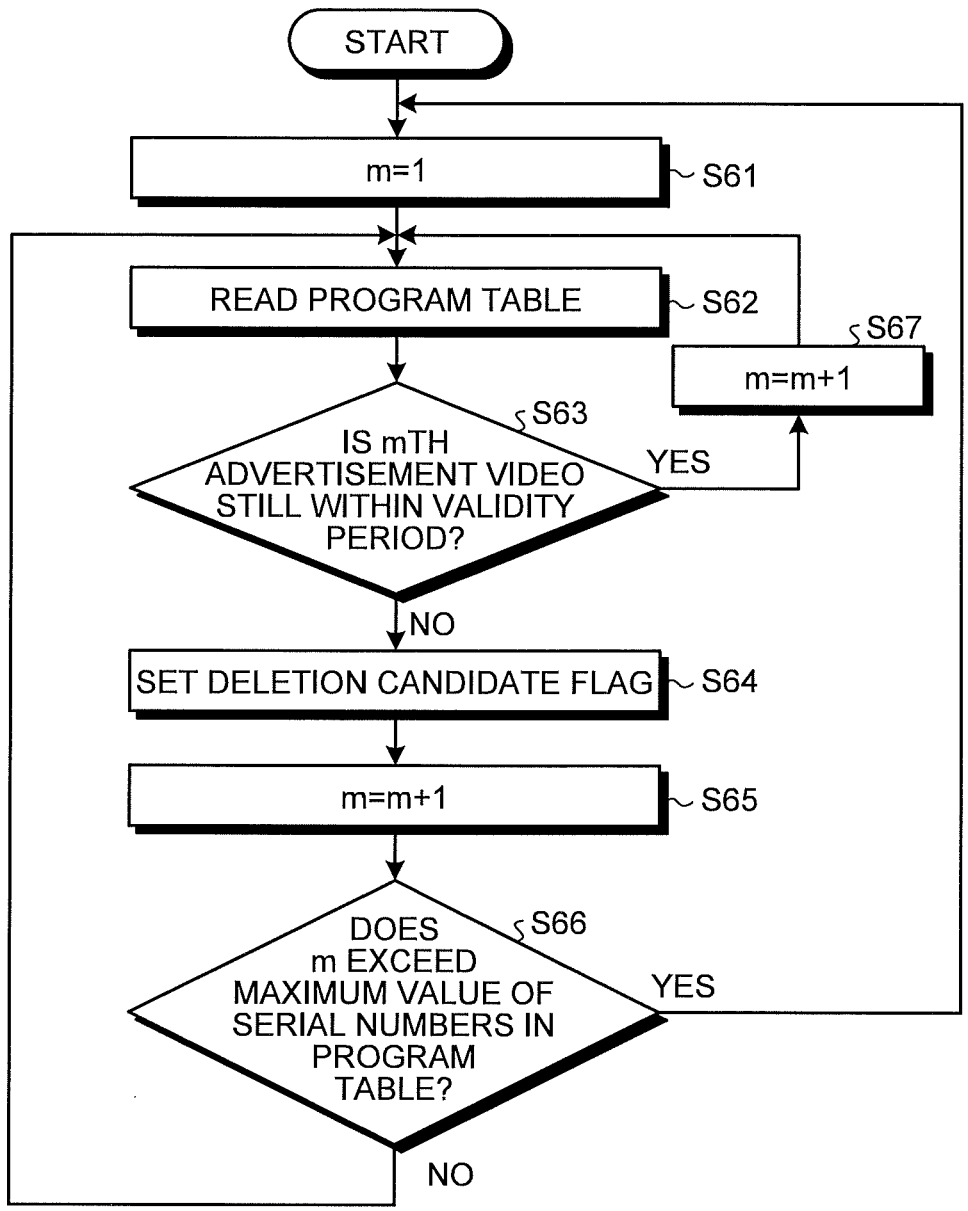
FIG. 6 depicts an exemplar flowchart of a flow of determining video data that is a candidate for deletion.

FIG. 6 is a flowchart of an example of a flow of determining video data as a candidate for deletion. For the video data 60a with m=1 (Step S61), the deletion determining unit 11 reads the program table 40c (Step S62). The deletion determining unit 11 determines whether the video data 60a with m=1 is still within its validity period, and when the validity period of the video data 60a has expired (NO at Step S63), the deletion determining unit 11 sets a deletion candidate flag in the deletion-candidate-flag storage portion 46 (Step S64). The value m is incremented by 1 (Step S65). When the value m exceeds the maximum value of serial numbers indicated in the program table 40c as a result of incrementing m by 1 (YES at Step S66), the processes of Step S61 and the subsequent steps are repeated with the video data 60a exceeding the maximum value as m=1 data.

The value m is a variable, indicating a number assigned for determining the video data 60a in the program table 40c.

When the video data 60a with m=1 is still within its validity period (YES at Step S63), m is incremented by 1 (Step S67), and the processes of Step S62 and the subsequent steps are repeated for the second and subsequent video data 60a.

If m does not exceed the maximum value (NO at Step S66), the processes of Step S62 and the subsequent steps are repeated for the second and subsequent video data 60a.

Figure 7:
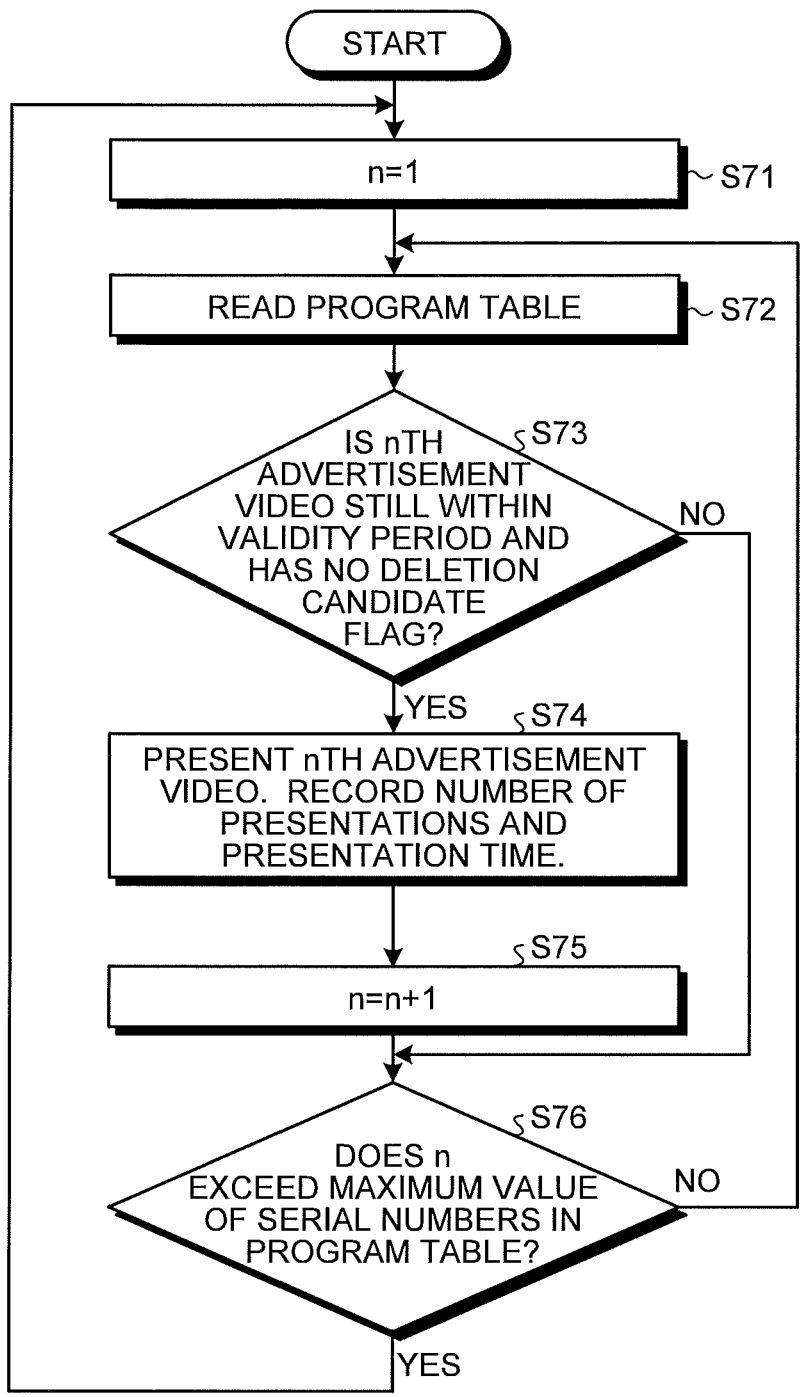
FIG. 7 depicts an exemplar flowchart of a flow of determining presentation on display devices.

FIG. 7 is a flowchart of an example of a flow of determining presentation on display devices. For the video data 60a with n=1 (Step S71), the video display controller 13 reads the program table 40b (Step S72). The video display controller 13 determines whether the video data 60a with n=1 is still within its validity period and has a deletion candidate flag. If the video data 60a is still within its validity period and does not have a deletion candidate flag (YES at Step S73), the corresponding advertisement video is presented on the display devices 1, the number of presentation in the presentation count table 50 is incremented by 1, and the last presentation time is recorded in the program table 40b (Step S74). Thereafter, n is incremented by 1 (Step S75), and if the value n exceeds the maximum value of serial numbers indicated in the program table 40b as a result of incrementing n by 1 (YES at Step S76), the processes of Step S71 and the subsequent steps are repeated with the video data 60a exceeding the maximum value as n=1 data.

The value n is a variable, and it indicates a number assigned for determining the video data 60a in the program table 40b.

When the validity period of the video data 60a exceeds a predetermined value or when the video data 60a has a deletion candidate flag (NO at Step S73), the flow proceeds to determination at Step S76 while skipping Steps S74 and S75.

If n has not exceeded the maximum value (NO at Step S76), the processes of Step S72 and the subsequent steps are repeated for the second and subsequent video data 60a.

It is possible to add a step for determining that upon reading the program table 40b by the video display controller 13 (Step S72), whether the read program table 40b has been updated to a new program table 40 transmitted from the ground transmission controller 6. For example, if the read program table 40*b* has not been updated, the processes of Step S73 and the subsequent steps can be repeated with the program table 40*b* not updated. When the read program table 40*b* has been updated, the processes of Step S71 and the subsequent steps can be repeated with the new program table 40*b*.

Figure 8:
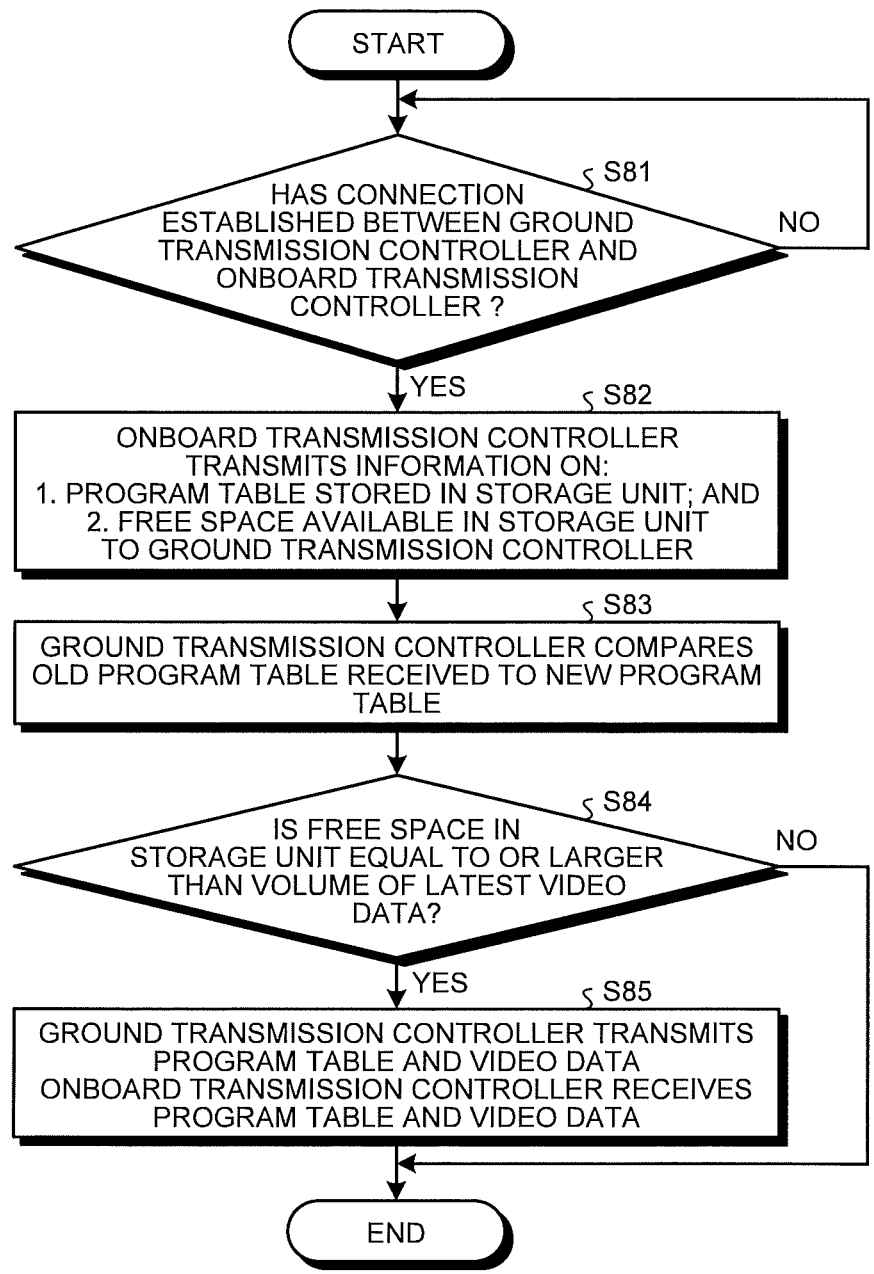
FIG. 8 depicts an exemplar flowchart of a flow of determining how much space is available in a storage unit on the ground transmission controller.

FIG. 8 is a flowchart of an example of a flow for determining how much space is available in the storage unit on the ground transmission controller. When the train stops at a station and a connection is established between the ground transmission controller 6 and the onboard transmission controller 3 (YES at Step S81), the onboard transmission controller 3 transmits the program table 40*a* stored in the storage unit 8 and information indicating how much space is free in the storage unit 8 to the ground transmission controller 6 (Step S82). The ground transmission controller 6 compares the received program table 40*a* transmitted from the onboard transmission controller 3 to the latest program table 40 stored in the information processing device 5 (Step S83). With this comparison, the ground transmission controller 6 can determine whether new video data 60*a* to be transmitted to the onboard transmission controller 3 is of a size that can be saved in the storage unit 8. When the free space in the storage unit 8 is equal to or larger than the volume of the new video data 60*a* (YES at Step S84), the ground transmission controller 6 transmits the latest program table 40 and the new video data 60*a* to the onboard transmission controller 3. The onboard transmission controller 3 receives the latest program table 40 and the new video data 60*a*, and stores them in the storage unit 8 (Step S85).

When the free space in the storage unit 8 is smaller than the volume of the video data 60*a* (NO at Step S84), the process terminates without the ground transmission controller 6 transmitting the video data 60*a* to the onboard transmission controller 3.

As described above, the ground transmission controller 6 can receive the program table 40*a* and data relating to the free space in the storage unit 8 from the onboard transmission controller 3, determine whether new video data 60*a* for transmission is of a size that can fit into the free space, and then transmit the video data 60*a* to the onboard transmission controller 3. Accordingly, when a free space in the storage unit 8 is small, for example, large-sized video data 60*a* cannot be transmitted while the video data 60*a* of a small size can be transmitted. This allows the free space in the storage unit 8 to be efficiently utilized. Also, because transmission of large-sized video data 60*a* can be avoided, the efficiency of transmission to the onboard transmission controller 3 can be improved as well.

Figure 9:
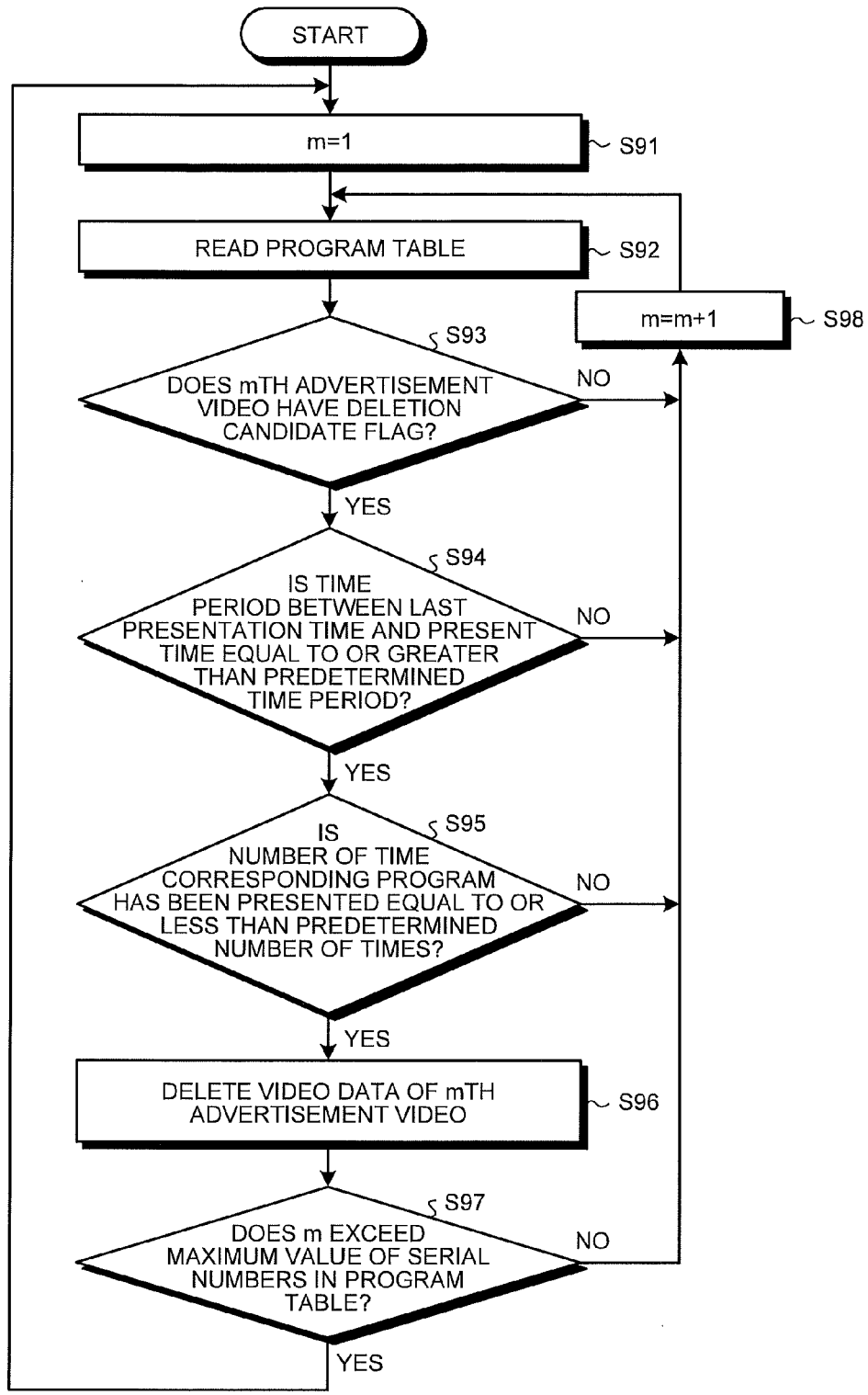
FIG. 9 depicts an exemplar flowchart of a flow of determining deletion of video data.

FIG. 9 is a flowchart of an example of a flow for determining deletion of video data. For the video data 60*a* with m=1 (Step S91), the deletion determining unit 11 reads the program table 40*c* (Step S92). The deletion determining unit 11 determines whether the video data 60*a* with m=1 is still within its validity period. If the validity period of the video data 60*a* has expired, the deletion determining unit 11 sets a deletion candidate flag in the deletion-candidate-flag storage portion 46. When a deletion candidate flag is set in the deletion-candidate-flag storage portion 46 (YES at Step S93), and when the time period from the last presentation time of the corresponding advertisement video to the present time is equal to or greater than a predetermined value (YES at Step S94), for example, the flow proceeds to Step S95. When the number of presentations is equal to or less than a predetermined value (YES at Step S95), the deleting unit 12 proceeds to Step S96, where the deleting unit 12 deletes the video data 60*a* (YES at Step S96). Setting of the predetermined values mentioned above can be made by the terminal 7 connected to the ground transmission controller 6, for example.

If a deletion candidate flag is not set in the deletion-candidate-flag storage portion 46 (NO at Step S93), the deleting unit 12 increments m by 1 (Step S98), and the processes of Step S92 and the subsequent steps is repeated for the second and subsequent video data 60*a*.

When the time period between the last presentation time of the advertisement video and the present time is less than the predetermined value (NO at Step S94), m is incremented by 1 (Step S98), and the processes of Step S92 and the subsequent steps are repeated for the second and subsequent video data 60*a*.

Further, when the number of presentations exceeds the predetermined value (NO at Step S95), m is incremented by 1 (Step S98), and the processes of Step S92 and the subsequent steps are repeated for the second and subsequent video data 60*a*.

When the value m exceeds the maximum value of serial numbers indicated in the program table 40*d* (YES at Step S97), the deleting unit 12 repeats the processes of Step S91 and the subsequent steps with the video data 60*a* exceeding the maximum value as m=1 data. When the value m does not exceed the maximum value (NO at Step S97), the deleting unit 12 increments m by 1 (Step S98), and repeats the processes of Step S92 and the subsequent steps for the second and subsequent video data 60*a*.

The free space in the storage unit 8 can be further increased by adding a step for determining the volume of the video data 60*a* after "NO" at Step S94 or S95 and deleting the video data 60*a* having a volume equal to or larger than a certain value.

The predetermined values can be varied from one video data to another. For example, for different pieces of video data, a larger or smaller number of presentations can be set as well as a longer or shorter time period from the last presentation time to the present time can be set. The combinations of determination steps shown above are merely examples and not limited thereto.

As described above, the passenger information control device 2 according to the first embodiment determines not only the validity period of the video data 60*a*, but the time period from the last presentation time of the corresponding advertisement video to the present time, the number of times the advertisement video has been presented and the like, and outputs a result of determination on deletion candidates. Therefore, an advertisement video that is probably requested to be presented again by the sponsor or the like after being played for a certain time period can be kept in the storage unit 8. This can avoid a situation where, for example, the video data 60*a* is once deleted and cannot be stored in the storage unit 8 again due to shortage of the free space in the storage unit 8 at a time when the video data 60*a* should be recorded again. In addition, because retransmission of deleted video data 60*a* to the passenger information control device 2 becomes less frequently, the efficiency of transmission between the ground transmission controller 6 and the onboard transmission controller 3 can be also improved.

Second Embodiment

The passenger information control device 2 according to a second embodiment is configured to secure a free space sufficient for the volume of newly received video data 60*a*.

Figure 10:
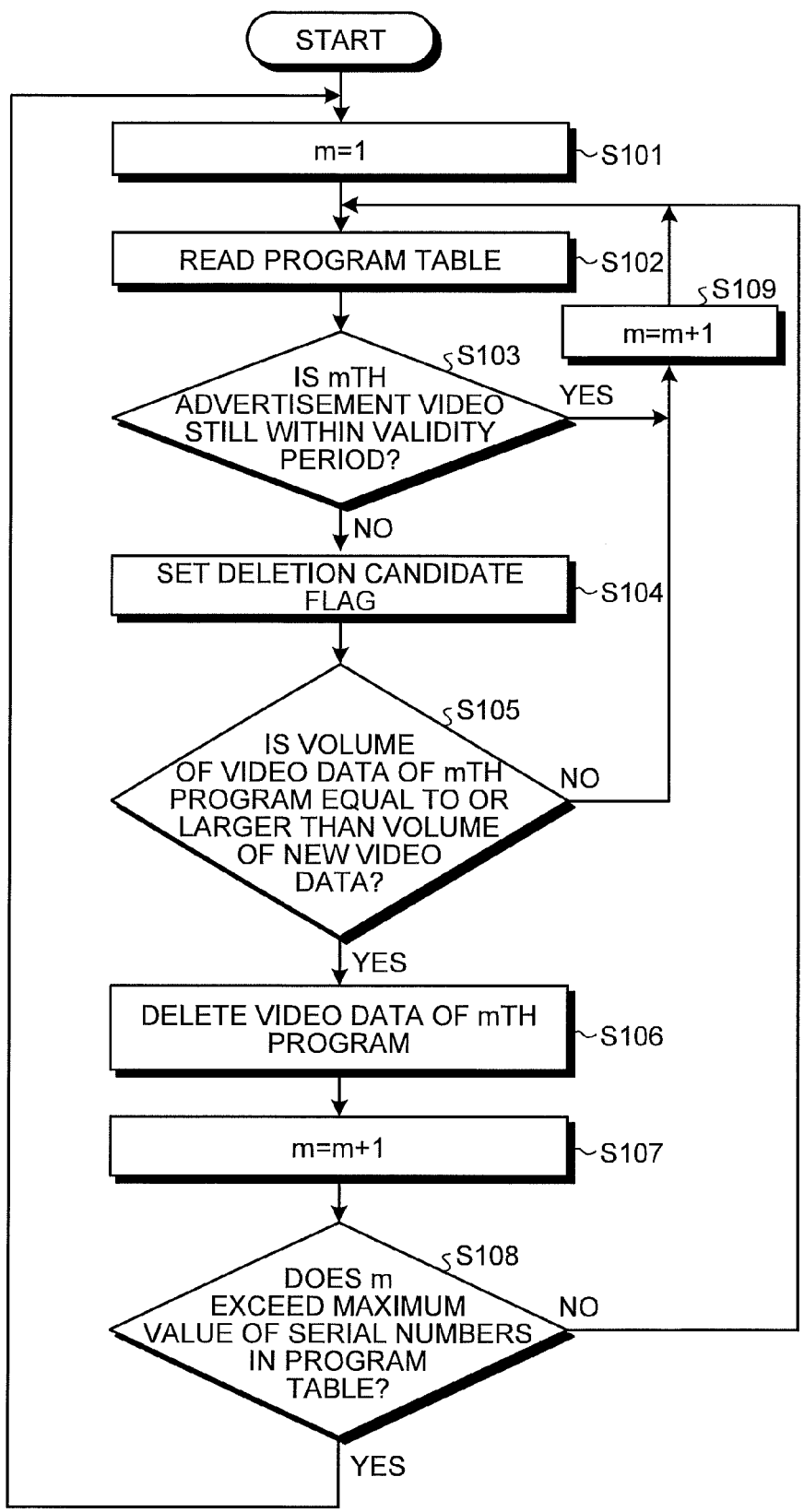
FIG. 10 depicts an exemplar flowchart of a flow of determining deletion of video data on a passenger information control device according to a second embodiment.

FIG. 10 is a flowchart of an example of a flow of determining deletion of video data on the passenger information control device according to the second embodiment. For the video data 60*a* with m=1 (Step S101), the deletion determining unit 11 reads the program table 40c (Step S102). The deletion determining unit 11 determines whether the video data 60a with m=1 is still within its validity period, and if the validity period of the video data 60a has expired (NO at Step S103), the deletion determining unit 11 sets a deletion candidate flag in the deletion-candidate-flag storage portion 46 (Step S104). The deleting unit 12 determines whether the volume of the video data 60a with m=1 is equal to or larger than the volume of the video data 60a to be newly received. When the volume of the video data 60a with m=1 is equal to or larger than the volume of the video data 60a to be newly received (YES at Step S105), the deleting unit 12 deletes the video data 60a with m=1 (Step S106), and increments m by 1 (Step S107). When the value m exceeds the maximum value of serial numbers indicated in the program table 40c as a result of incrementing m by 1 (YES at Step S108), the processes of Step S101 and the subsequent steps are repeated with the video data 60a exceeding the maximum value as m=1 data.

The volume of the video data 60a can be recognized because it is determined from the value of the file volume 45 in the program table 40a when the program table 40a is sent from the ground transmission controller 6.

If the video data 60a with m=1 is still within its validity period (YES at Step S103), m is incremented by 1 (Step S109), and the processes of Step S102 and the subsequent steps are repeated for the second and subsequent video data 60a.

When the volume of the video data 60a with m=1 is smaller than the volume of video data 60a to be newly received (NO at Step S105), m is incremented by 1 (Step S109), and the processes of Step S102 and the subsequent steps are repeated for the second and subsequent video data 60a.

If the value m has not exceeded the maximum value (NO at Step S108), the processes of Step S102 and the subsequent steps are repeated for the second and subsequent video data 60a.

As described above, the passenger information control device 2 according to the second embodiment deletes only the video data 60a whose volume is large enough for the volume of the video data 60a to be newly received from among advertisement videos designated as candidates for deletion due to expiration of validity period at a time when the onboard transmission controller 3 receives the program table 40a. Therefore, when a sponsor requests that a new advertisement video be preferentially presented, for example, the latest video data 60a can be stored without having to delete all of the video data 60a that will be represented.

Third Embodiment

The passenger information control device 2 according to a third embodiment is configured to delete the video data 60a that has been presented for a predetermined number of times, without relying on the time period from the last presentation time to the present time or validity period.

Figure 11:
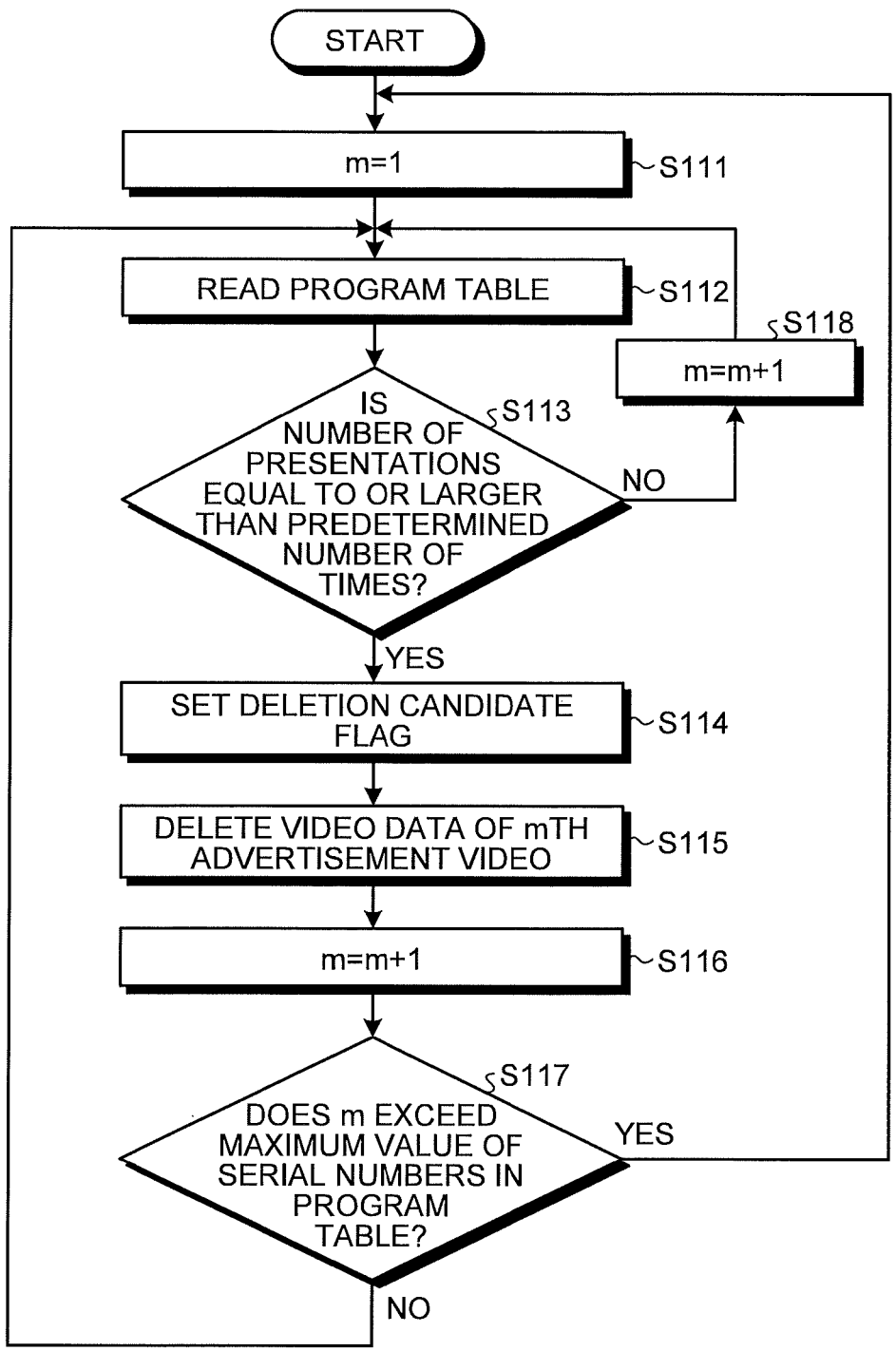
FIG. 11 depicts an exemplar flowchart of a flow of determining deletion of video data on a passenger information control device according to a third embodiment.

FIG. 11 is a flowchart of an example of a flow for determining deletion of video data on the passenger information control device according to the third embodiment. For the video data 60a with m=1 (Step S111), the deletion determining unit 11 reads the program table 40c (Step S112). The deletion determining unit 11 determines whether the number of times the video data 60a with m=1 has been presented is equal to or greater than a predetermined value. When the number of presentation times the video data 60a with m=1 has been presented is equal to or greater than the predetermined value (YES at Step S113), the deleting unit 12 sets a deletion candidate flag in the program table 40d (Step S114), and deletes the video data 60a (Step S115). The value m is incremented by 1 (Step S116). When the value m exceeds the maximum value of serial numbers indicated in the program table 40d as a result of incrementing m by 1 (YES at Step S117), the processes of Step S111 and the subsequent steps are repeated with the video data 60a exceeding the maximum value as m=1 data.

If the number of times the video data 60a with m=1 has been presented is less than the predetermined value (NO at Step S113), m is incremented by 1 (Step S118), and the processes of Step S112 and the subsequent steps are repeated for the second and subsequent video data 60a.

If m does not exceed the maximum value (NO at Step S117), the processes of Step S112 and the subsequent steps are repeated for the second and subsequent video data 60a.

As described above, the passenger information control device 2 according to the third embodiment deletes the video data 60a that has been presented for a predetermined number of times. Therefore, it is able to preferentially delete video data that can be deleted regardless of the time period since its last presentation time or validity period, such as an advertisement video whose number of presentations is fixed, to secure a free space in the storage unit 8. The passenger information control device 2 can also delete the video data 60a that is not a candidate for deletion because its validity period has not expired when the number of presentations of the video data 60a has reached a predetermined number of times. Thus, a free space can be secured in the storage unit 8 more efficiently than the conventional approach of deleting the video data 60a upon expiration of validity period.

Fourth Embodiment

The passenger information control device 2 according to a fourth embodiment is configured to be able to delete the video data 60a based on deletion candidate flags that are set on the ground transmission controller 6 side.

FIG. 12 is a flowchart of an example of a flow for determining deletion of video data on the ground transmission controller. When the train stops at a station and a connection is established between the ground transmission controller 6 and the onboard transmission controller 3 (YES at Step S121), the onboard transmission controller 3 transmits the program table 40a stored in the storage unit 8 and information indicating a free space available in the storage unit 8 to the ground transmission controller 6 (Step S122). When the program table 40a transmitted from the onboard transmission controller 3 contains any video data 60a that should be deleted (YES at Step S123), a deletion candidate flag is set in the program table 40 on the terminal 7 (Step S124). The latest program table 40 with the deletion candidate flag is transmitted to the onboard transmission controller 3 (Step S125). Upon receiving the latest program table 40, the onboard transmission controller 3 stores the program table 40 in the storage unit 8, and sends the program table 40 to the deletion determining unit 11 and the deleting unit 12, which delete the video data 60a with the deletion candidate flag set (Step S126).

If no video data 60a for deletion is found in the program table 40a transmitted from the onboard transmission controller 3 on the terminal 7 (NO at Step S123), the process terminates without setting a deletion candidate flag in the program table 40a.

As described above, according to the passenger information control device 2 of the fourth embodiment, a deletion candidate flag is set on the ground transmission controller 6 and the video data 60a can be deleted based on the deletion candidate flag. It is therefore possible to arbitrarily delete the video data 60a and receive new video data 60a without relying on the time period between the last presentation time and the present time, the validity period, or the number of times an advertisement video has been presented. In addition, with the ability to delete the video data 60a at an arbitrary time, sponsors' requests can be flexibly handled.

INDUSTRIAL APPLICABILITY

As described above, the passenger information control device according to the present invention is useful as a passenger information control device having a video display controller that transmits video data of in-train advertisements to display devices in a train.

The invention claimed is:

1. A passenger information control device having a video display controller that transmits, to a display device in a train, video data for an in-train advertisement, which is transmitted from a ground transmission controller to an onboard transmission controller, the passenger information control device comprising:
 a storage unit configured to store a program table and the video data, the program table storing at least one of the following factors, (i) number of times an advertisement video has been presented, (ii) a validity period of the advertisement video, (iii) a time period from a last presentation time to present time, and (iv) a volume of the video data, being associated with each advertisement;
 a deletion determining unit configured to receive the program table via the video display controller and determine whether to designate the video data as a candidate for deletion based on at least one factor in the program table; and
 a deleting unit configured to analyze the video data designated as a candidate for deletion relative to at least one of said factors, and to selectively delete video data designated as a candidate for deletion based on said analysis, wherein
 the deleting unit further selectively deletes the video data with a deletion candidate flag set by the ground transmission controller, the deletion candidate flag indicating the video data that is a candidate for deletion in the program table.

2. The passenger information control device according to claim 1, wherein the deletion determining unit determines a volume of the video data, and sets the flag on video data having a volume equal to or larger than a predetermined volume.

3. The passenger information control device according to claim 1, wherein the deletion determining unit determines the number of times the video data has been presented, and sets the flag on video data that has been presented for a predetermined number of times or more.

4. The passenger information control device according to claim 1, wherein the onboard transmission controller transmits the program table to the ground transmission controller, and receives the program table back from the ground transmission controller with a flag indicating video data that is a candidate for deletion set by the ground transmission controller.

5. The passenger information control device according to claim 2, wherein the onboard transmission controller transmits the program table to the ground transmission controller, and receives the program table back from the ground transmission controller with a flag indicating video data that is a candidate for deletion set by the ground transmission controller.

6. The passenger information control device according to claim 3, wherein the onboard transmission controller transmits the program table to the ground transmission controller, and receives the program table back from the ground transmission controller with a flag indicating video data that is a candidate for deletion set by the ground transmission controller.

7. The passenger information control device according to claim 1, wherein the ground transmission controller compares a first program table transmitted from the onboard transmission controller to a second program table stored in the ground transmission controller, and transmits video data for a program that is not recorded in the first program table to the onboard transmission controller.

8. The passenger information control device according to claim 1, wherein the ground transmission controller compares a first program table transmitted from the onboard transmission controller to a second program table stored in the ground transmission controller, and transmits video data for a program that is not recorded in the first program table to the onboard transmission controller.

9. The passenger information control device according to claim 2, wherein the ground transmission controller compares a first program table transmitted from the onboard transmission controller to a second program table stored in the ground transmission controller, and transmits video data for a program that is not recorded in the first program table to the onboard transmission controller.

10. The passenger information control device according to claim 3, wherein the ground transmission controller compares a first program table transmitted from the onboard transmission controller to a second program table stored in the ground transmission controller, and transmits video data for a program that is not recorded in the first program table to the onboard transmission controller.

11. The passenger information control device according to claim 4, wherein the ground transmission controller compares a first program table transmitted from the onboard transmission controller to a second program table stored in the ground transmission controller, and transmits video data for a program that is not recorded in the first program table to the onboard transmission controller.

12. The passenger information control device according to claim 5, wherein the ground transmission controller compares a first program table transmitted from the onboard transmission controller to a second program table stored in the ground transmission controller, and transmits video data for a program that is not recorded in the first program table to the onboard transmission controller.

13. The passenger information control device according to claim 6, wherein the ground transmission controller compares a first program table transmitted from the onboard transmission controller to a second program table stored in the ground transmission controller, and transmits video data for a program that is not recorded in the first program table to the onboard transmission controller.

14. A method for providing video data for a passenger information control device having a transmitting step of transmitting, to a display device in a train, video data for an in-train advertisement, which is transmitted from a ground transmission controller to an onboard transmission controller, the method comprising:
 a storing step of storing a program table and the video data, the program table storing at least one of the following factors, (i) number of times an advertisement video has been presented, (ii) a validity period of the advertisement video, (iii) a time period from a last presentation time to present time, and (iv) a volume of the video data, being associated with each advertisement;

a deletion determining step of receiving the program table and determining whether to designate the video data as a candidate for deletion based on at least one factor in the program table; and a deleting step of analyzing the video data designated as a candidate for deletion relative to at least one of said factors, and selectively deleting video data designated as a candidate for deletion based on said analyzing, wherein the deleting step includes further selectively deleting the video data with a deletion candidate flag set by the ground transmission controller, the deletion candidate flag indicating the video data that is a candidate for deletion in the program table.

* * * * *